United States Patent [19]
Hofer et al.

[11] Patent Number: 5,354,190
[45] Date of Patent: Oct. 11, 1994

[54] DEVICE FOR MAKING TUBING FOILS

[75] Inventors: Werner R. Hofer, Friedberg; Franz Mahler, Augsburg; Manfred Goellner, Augsburg; Andreas Gumpert, Augsburg, all of Fed. Rep. of Germany

[73] Assignee: Alpine Aktiengesellschaft, Fed. Rep. of Germany

[21] Appl. No.: 8,589

[22] Filed: Jan. 25, 1993

[30] Foreign Application Priority Data

Jan. 27, 1992 [EP] European Pat. Off. ........ 92101237.3

[51] Int. Cl.⁵ ............................................. B29D 23/22
[52] U.S. Cl. ................................. 425/72.1; 425/141; 425/326.1; 425/387.1
[58] Field of Search .............. 425/72.1, 326.1, 387.1, 425/141; 264/209.3, 209.7, 566, 569

[56] References Cited

U.S. PATENT DOCUMENTS

| | | | |
|---|---|---|---|
| 3,568,252 | 3/1971 | Masuda et al. | 425/72.1 |
| 3,709,290 | 1/1973 | Upmeier | 425/72.1 X |
| 4,112,034 | 9/1978 | Nash et al. | 425/72.1 X |
| 4,330,501 | 5/1982 | Jones et al. | 425/326.1 X |
| 4,606,879 | 8/1986 | Cerisano | 264/569 X |
| 4,624,823 | 11/1986 | Audureau et al. | 264/566 X |
| 4,626,397 | 12/1986 | Bose | 264/569 X |
| 4,818,467 | 4/1989 | Audureau et al. | 425/72.1 X |
| 4,938,903 | 7/1990 | Schaeffer et al. | 425/72.1 X |

FOREIGN PATENT DOCUMENTS

| | | |
|---|---|---|
| 2658518 | 4/1983 | Fed. Rep. of Germany . |
| 3743720 | 12/1990 | Fed. Rep. of Germany ..... 425/72.1 |

*Primary Examiner*—Richard L. Chiesa
*Attorney, Agent, or Firm*—Pascal & Associates

[57] ABSTRACT

In order to make the thickness and strength values uniform in an extruded foil tubing made of high density polyethylene (HDPE), in the form of a long neck, an air nozzle ring is provided at the level of the end of the long neck in addition to an outer blow ring surrounding the ring nozzle of the blow head. The rate of air flow through the nozzles of the air nozzle ring is controlled dependent on a rotating measuring device for measuring the thickness of the foil which is located above the expansion portion of the foil tubing. The cooling effect of the outer blow ring is preferably twenty times greater than that of the air nozzle ring. To stabilize the foil bubble, an inner pin is provided at the level of the end of the long neck.

11 Claims, 1 Drawing Sheet

DEVICE FOR MAKING TUBING FOILS

FIELD OF THE INVENTION

This invention relates to apparatus for making tubing foils made of the thermoplastic synthetic material.

BACKGROUND TO THE INVENTION

German patent DE 26 58 518 C2 describes such apparatus. It shows typical conditions when processing LDPE (Low Density Polyethylene). Just after leaving a ring nozzle, tubing foil expands to its final diameter. An outer blow ring is provided, the nozzles of which are directed diagonally upward onto the area of the expansion. Following a flattening device for the tubing foil, a measuring device is provided with which the thickness flow of the foil is measured. The rate of air flow through the nozzles of the air nozzle ring is controlled dependent on this thickness flow to prevent the formation of so-called barrel hoops on the tubing foil. As a result of cooling by means of the nozzles of the air nozzle ring, a thickening of the foil tubing is attained in the region of the cooling. When heating is used, the foil becomes thinner in the heated area.

When processing HDPE (High Density Polyethylene), one usually works with a long neck which is possible, among other things, due to the expansion viscosity which is higher in comparison to LDPE. It became apparent in this case that the cooling of the tubing was not uniform in this region due to the length of the long neck and due to the resultant differences in temperature which led to differences in the expansion viscosity. These differences in the expansion viscosity disadvantageously influence the foil tolerance.

To counter this, attempts were made to divide the outer blow ring surrounding the ring nozzle into segments in which the rate of air flow could be adjusted. An example of this type of a device is described in German patent DE 37 43 720 C2.

A further possibility for reducing the differences in viscosity is the use of devices which led the cooling air coming out from the outer blow ring into a chamber surrounding the long neck, the chamber being provided with one or more iris diaphragms. However, differences in expansion viscosity in the material also occur with a device of this type.

SUMMARY OF THE INVENTION

It is an object of the present invention to achieve an effective uniformity of the expansion viscosity when processing HDPE with a long neck.

This object is solved by providing an apparatus for manufacturing tubing foils made of high density polyethylene (HDPE) synthetic material comprising a blow head having a ring nozzle and an outer blow ring, an inner cooling device and an air nozzle ring disposed above the blow head, and a measuring device for measuring the foil thickness of the tubing foil whereby the rate of air flow through the nozzles of the air nozzle ring is controlled dependent of the measurement results of the measuring device, the air nozzle ring being located in the region of the end of the long neck, the outer diameter of the pin being slightly less than the inside diameter of the tubing foil in the region, the cooling effect of the outer blow ring being at least ten times greater than the cooling effect in the region.

By making the differences in the expansion viscosity uniform, one not only obtains a uniformly thin foil but, at the same time, the strength of the foil in longitudinal and transverse direction is made uniform. Furthermore, a higher output is attained since the rate of air flow at the outer blow ring can be at a maximum. As a result of the cooling directed to specific points by means of the nozzles of the air nozzle ring, the longitudinal and transverse stretching of the material is reduced at the cooled point, so that the foil becomes thicker at this point than without this spot-type cooling.

Cooling by means of the air nozzle ring takes place just before the material is transversely stretched. An adjustment of the temperature between more or less cooled areas is no longer possible hereby, so that the temperature influence of the foil takes place relatively accurately at those points where it is actually necessary. Furthermore, an area is cooled by the air nozzle ring where the material is longitudinally stretched in the direction of extrusion and thus has a relatively large surface relative to its thickness.

An inner pin ensures that the foil tubing does not travel out of its vertical axis when the air nozzle ring blows against only one side of the foil tubing.

It is very important that the cooling effect of the outer blow ring should be substantially greater than the cooling effect at the end of the long neck.

BRIEF INTRODUCTION TO THE DRAWINGS

An embodiment of the invention will be described in greater detail below with reference to the single drawing which shows a sectional view through the device.

DETAILED DESCRIPTION OF THE INVENTION

Figure 1:
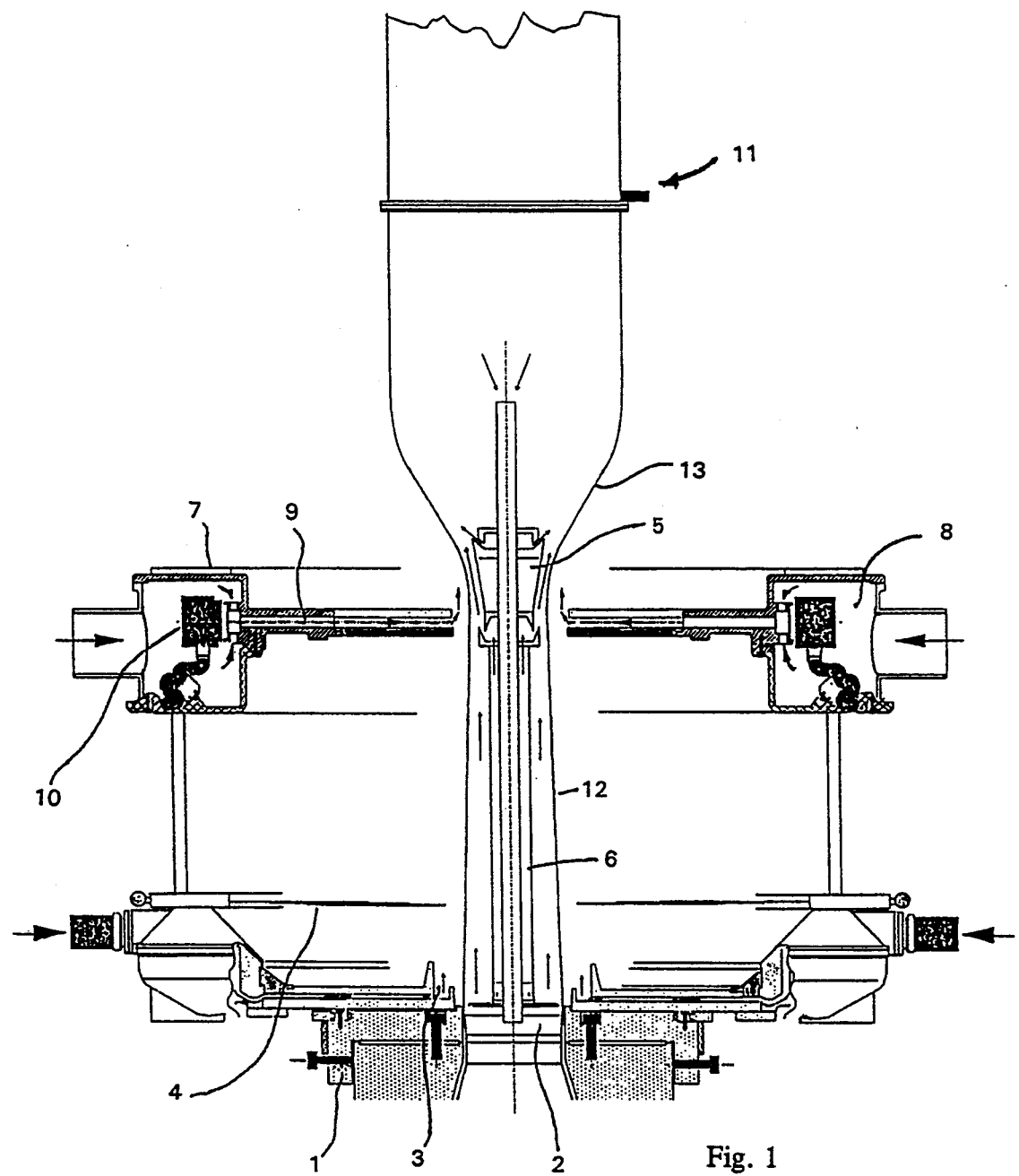

An apparatus has a blow head 1 which comprises a ring nozzle 2 and an outer blow ring 3 surrounding the ring nozzle 2. An iris diaphragm 4 is provided above the ring nozzle 2 and the outer blow ring 3. On the inside, the blow head has an inner pin 5 which is located on a pipe 6. In addition, the pin of the extruder has an air supply for cooling air which is not shown.

On the outside, the blow head has an air nozzle ring 7. This air nozzle ring is comprised of an annular chamber 8 from which tubular air nozzles 9 proceed radially inward. Between each chamber 8 and nozzles 9, a valve 10 is provided which controls the rate of air flow through the respective nozzle 9. The nozzles 9 are telescopic in radial direction. There are, for example, 32 nozzles 9. The outer blow ring 3 and the air nozzle ring 7 are attached to separate air supply systems.

A rotating measuring device 11, supported by a carrier which is not shown, is provided above the air nozzle ring 7 for measuring the thickness of the foil. It measures the foil thickness, for example, capacitively or by means of infrared rays. It carries out reversing rotations.

The material coming out from the aperture of the ring nozzle 2 first forms a constricting long neck 12 in which the material is longitudinally stretched. Expansion 13 takes place at the end of the long neck where the material is transversely stretched. The long neck 12 is cooled by the air from the outer blow ring, whereby the iris diaphragm 4 is used to supply the air. At the same time, the inner side of the long neck 12 is cooled by cooling air emerging from the pin of the extruder. This cooling air flows about the inner pin 5 with a slight gap and then enters into the upper end of pipe 6 projecting beyond the inner pin 5. The air nozzle ring 7, which can be adjusted in its height, is located in such a way that the ends of the nozzles 9 are directed to the location of the long neck prior to the material being transversely stretched.

While rotating, the measuring device 11 continuously measures the thickness of the finished foil and transmits measured values to a control device which controls the valves 10 and thus the respective rate of air flow through the nozzles 9, dependent on the thickness pattern ascertained.

The cooling effects of the outer blow ring 3 and in the area of the end of the long neck 12 are laid out in such a way that the cooling effect through the outer blow ring 3 is at least ten times greater, and preferably twenty times greater, than in the area of the end of the long neck 12. The cooling effect of the air nozzle ring should preferably be less in the area of the end of the long neck than the cooling effect of the cooling air flowing about the inner pin 5.

If necessary, the inner pin can have an air nozzle ring with nozzles directed radially outward. In this case, pipe 6 is constructed as a double pipe in which the cooling air is supplied to these nozzles and drawn off, as shown.

Since the measuring device 11 is disposed at only a slight distance above the expansion 13, signal processing takes place with only a short dead time, i.e. having a duration which is only insignificantly greater than the length of time it takes the material to move from the air nozzle ring 7 to the measuring device 11. If the inner pin 5 has, as noted above, an air nozzle ring, then the rate of flow through the individual nozzles can also be controlled dependent on the measurement results of the measuring device 11.

The height of the inner pin 5 can also be adjusted, so that the height of the inner pin 5 and the air nozzle ring 7 can be adapted to the respective height of the end of the long neck 12. Due to the radial adjustability of the nozzles 9, it is possible to adapt to various diameters of the foil tubing at the end of the long neck.

We claim:

1. Apparatus for manufacturing tubing foils made of high density polyethylene (HDPE) thermoplastic synthetic material, the tubing foil forming a long neck prior to its expansion, comprising a blow head having a ring nozzle and an outer blow ring, an air nozzle ring disposed in a region of the end of the long neck and outside the tubing foil, an inner pin being located in the region of the end of the long neck, and a measuring device for measuring the foil thickness of the tubing foil whereby the air flow through the nozzles of the air nozzle ring is controlled dependent on measurement results of the measuring device, the blow head supporting an inner cooling device, the outer diameter of the pin being slightly less than the inside diameter of the tubing foil in said region, and means for causing the cooling effect of the outer blow ring to be at least ten times greater than the cooling effect in said region.

2. Apparatus as defined in claim 1, including means for causing the cooling effect of the outer blow ring to be about twenty times greater than the cooling effect in said region.

3. Apparatus as defined in claim 1, in which the inner pin is formed as an air nozzle cooling ring, the cooling effect of which is at least as great as the cooling effect of the air nozzle ring.

4. Apparatus as defined in claim 1, in which the inner pin is formed as an air nozzle cooling ring, the cooling effect of which is at least as great as the cooling effect of the air nozzle ring.

5. Apparatus as defined in claim 4, including means for causing the cooling effect of the air nozzle cooling ring to be greater than that of the air nozzle ring.

6. Apparatus as defined in claim 4 or 5, including means for controlling the rate of air flow through the radially arranged nozzles of the air nozzle cooling ring dependent on the measurement results of the measuring device.

7. Apparatus as defined in claim 1 including means for adjusting the height of the air nozzle ring.

8. Apparatus as defined in claim 1 in which the height of the inner pin is adjustable.

9. Apparatus as defined in claim 1 in which the measuring device is located between a frost line of the tubing foil and a flattening device for the tubing foil.

10. Apparatus as defined in claim 1 in which the measuring device is rotatable.

11. Apparatus as defined in claim 1 in which nozzles of the nozzle ring are adjustable in their radial length.

* * * * *